United States Patent [19]
Denton, III et al.

[11] Patent Number: 6,099,990
[45] Date of Patent: Aug. 8, 2000

[54] CARBON ELECTRODE MATERIAL FOR ELECTROCHEMICAL CELLS AND METHOD OF MAKING SAME

[75] Inventors: Frank R. Denton, III, Lawrenceville; Daryl R. Smith, Sugar Hill, both of Ga.

[73] Assignee: Motorola, Inc., Schaumburg, Ill.

[21] Appl. No.: 09/048,634

[22] Filed: Mar. 26, 1998

[51] Int. Cl.$^7$ .................................................... H01M 4/58
[52] U.S. Cl. ................................. 429/231.8; 429/231.4; 423/447.5
[58] Field of Search .............................. 423/447.4, 447.2, 423/447.7, 447.8, 447.9; 429/231.4, 231.8

[56] References Cited

U.S. PATENT DOCUMENTS

| | | | |
|---|---|---|---|
| 4,937,223 | 6/1990 | Yamaguchi | 502/427 |
| 5,219,680 | 6/1993 | Fauteux | 429/192 |
| 5,427,875 | 6/1995 | Yamamoto et al. | 429/223 |
| 5,536,597 | 7/1996 | Takahashi et al. | 429/194 |
| 5,589,289 | 12/1996 | Zhang et al. | 429/122 |
| 5,591,548 | 1/1997 | Mao | 429/218 |
| 5,635,151 | 6/1997 | Zhang et al. | 423/445 |
| 5,658,685 | 8/1997 | Oliver | 429/190 |
| 5,702,845 | 12/1997 | Kawakami et al. | 429/224 |
| 5,888,670 | 3/1999 | Kawakami | 429/231.4 |

OTHER PUBLICATIONS

Linden, editor, "Handbook of Batteries, Second Edition", McGraw–Hill, pp. 3–1 through 3–11, 1995. No Month available.

Handbook of Carbon, Graphite, Diamond and Fullerenes, Properties, Processing and Applications, by Hugh O. Pierson, Noyes Publications, 1993. (no month available)

*Primary Examiner*—Carol Chaney
*Attorney, Agent, or Firm*—Felipe Farley; Philip H. Borrus, IV

[57] ABSTRACT

A method (50) of fabricating a microscopically dense amorphous carbon material for use as an electrode (20) in an electrochemical cell (10) includes the steps of mixing a lignin material with a matrix-enhancing salt, and subsequently heating (72) the mixture.

8 Claims, 12 Drawing Sheets

CARBON ELECTRODE MATERIAL FOR ELECTROCHEMICAL CELLS AND METHOD OF MAKING SAME

TECHNICAL FIELD

This invention relates in general to the field of electrodes and electrode materials for electrochemical cells, and in particular to methods of synthesizing said electrodes and electrode materials.

BACKGROUND OF THE INVENTION

As electronic devices increasingly become portable, advances must be made in energy storage systems to enable such portability. Indeed, it is often the case with current electronic technology that the limiting factor to portability of a given device is the size and the weight of the associated energy storage device. A small energy storage device, such as a battery, may be fabricated for a given electrical device but at the cost of energy capacity. Conversely, a long lasting energy source can be built but it is often too large or too bulky to be comfortably portable. The result is that the energy source is either too heavy or does not last long enough for a particular user's application.

Numerous different battery systems have been proposed for use over the years. Early rechargeable battery systems included lead acid, and nickel cadmium (NiCad), each of which has enjoyed considerable success in the market place. Lead acid batteries are preferred for applications in which ruggedness and durability are required and hence have been the choice of automotive and heavy industrial settings. Conversely, NiCad batteries have been preferred for smaller portable applications. More recently, nickel metal hydride systems (NiMH) have found increasing acceptance for both large and small applications.

Notwithstanding the success of the foregoing battery systems, other new batteries are appearing on the horizon which offer the promise of better capacity, better power density, longer cycle life, and lower weight, as compared with the current state of the art. The first such system to reach the market is the lithium ion battery, which is already finding its way into numerous consumer products. Lithium polymer batteries are also receiving considerable attention, although they have not yet reached the market.

Lithium batteries in general include a positive electrode fabricated of, for example, a transition metal oxide material and a negative electrode fabricated of an activated carbon material such as graphite or petroleum coke. New materials for both electrodes have been investigated intensely because of the high potential for improved energy density. To date, however, most of the attention has been focused on the transition metal oxide electrode.

Activated carbon electrode materials are routinely prepared by using difunctional monomers as polymer precursors. Examples of such precursors include resins of furfuryl alcohol, phenyl, formaldehyde, acetone, furfuryl or furfuryl alcohol-phenyl copolymers. Other precursors include polyacrylonitrile, and rayon polymers, as disclosed in *Handbook of Carbon, Graphite, Diamond and Fullerenes*, Hugh O. Pierson, Noyes Publications, Park Ridge, N.J., (1993). Materials that result from these processes are typically characterized by relatively low yields, as well as high cost and low capacity.

In addition to these considerations, it is desirable to employ readily available and renewable precursor materials, particularly those with a relatively high char yield, so as to yield an amorphous carbon material. It is noted that otherwise promising candidates among both synthetic and natural classes of materials melt during pyrolysis at temperatures well below the cure or thermoset point, resulting in viscous melts that foam upon the production of offgases prior to curing during carbonization. The resulting numerous pores harden into permanent morphological structure during heating, with attendant decrease of maximum electrochemical performance of the carbon product.

Accordingly, there exists a need for improved carbon materials for use in electrochemical cell applications.

DETAILED DESCRIPTION OF THE PREFERRED EMBODIMENT

Figure 1:
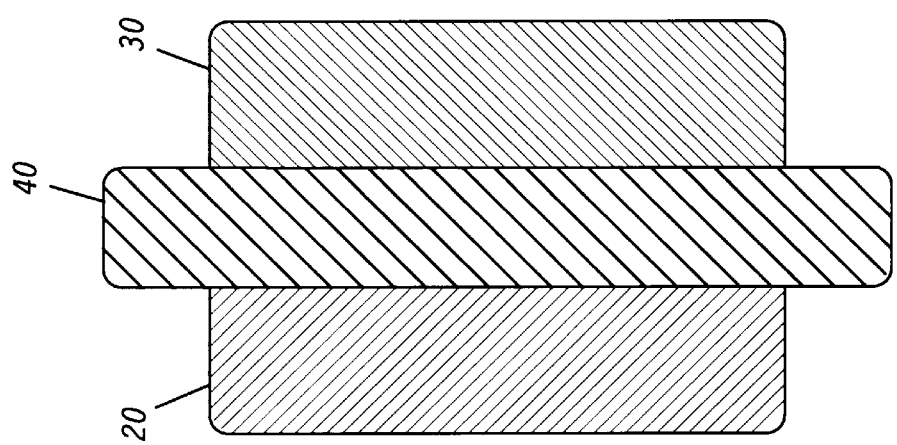
FIG. 1 is a schematic representation of an electrochemical cell including an electrode fabricated of a carbon material in accordance with the instant invention.

The invention is a method of fabricating a microscopically dense amorphous carbon material for use as an electrode in a electrochemical cell, and includes the steps of mixing an organic substrate material with a matrix-enhancing salt, and subsequently heating the mixture. In one embodiment of the present invention, the electrochemical cell is a rechargeable cell.

In summary, the carbon material as described above is produced by heating a precursor material, such as lignin, in intimate mixture with a salt in a first heating step until the precursor material is fully cured, after which optionally the material is cooled and comminuted to a desired particle size. Thereafter, the material is heated to a second, higher temperature to carbonize the material, resulting in an amorphous carbon material with reduced pore size and content. This carbon material has a yield and electrochemical capacity that is greater than that of carbon material that has not undergone co-pyrolysis with the salt.

Furthermore, the addition and blending of carbon precursor material with salt in accordance with the present invention occurs before the precursor material has completely melted. As a result, foaming is reduced, less furnace volume is required for each pyrolysis run, faster heating rates and slower gas flow may be used, and electrochemical characteristics of the product carbon material are superior. A further advantage is that this method allows one to expand the range of suitable inexpensive organic precursors that may be employed as carbon precursors, since their volatility may be controlled at lower cost.

It is known that multi-functional organic monomers, as well as highly aromatic polyesters with aliphatic spacers, can produce excellent carbons for use in lithium rechargeable electrochemical cells. Specifically, such materials are disclosed in, for example, U.S. Pat. Nos. 5,589,289 and 5,635,151 in the name of ZHANG, et al, assigned to Motorola, Inc., issued Dec. 31, 1996 and Jun. 3, 1997, respectively, the disclosures of which are incorporated herein by reference. Quite often, such multi-functional organic monomers and highly aromatic polyesters are synthetic.

It has also been shown that carbons with excellent performance can also be obtained from inexpensive renewable materials with high char yields: lignins in particular have been found to be excellent choices as carbonization substrates, e.g., in U.S. patent application Ser. No. 08/660,320, filed Jun. 7, 1996 in the name of Zhang et al., and assigned to Motorola, Inc., entitled CARBON ELECTRODE MATERIAL FOR ELECTROCHEMICAL CELLS AND METHOD OF MAKING SAME, and 08/901,175, filed Jul. 28, 1997 in the name of Denton et al., and assigned to Motorola, Inc., and having an identical title. The use of carbons synthesized as in U.S. patent application Ser. No. 08/660,320 in densely-packed mixtures was described in U.S. patent application Ser. No., 08/927,099 P01, filed Aug. 31, 1997 in the name of Mao, et al., and assigned to Motorola, Inc. U.S. patent application Ser. Nos. 08/660,320; 08/901,175; and 08/927,099 are incorporated herein by reference.

For both the multifunctional monomers and the lignins, it is believed that the substrate materials cure to form a non-flowable, cross-linked network early in the carbonization process. This then provides a mechanically stable matrix and allows one to control or eliminate viscous foaming during off-gas formation and thus to control the quality of the product carbon. The practitioner of the electrode-making art would like to be able to generate satisfactory carbons from virtually any inexpensive carbon substrate: changes in the price, quality, or availability of various carbon substrates might make it commercially advantageous from time to time to shift to a different grade or identity of carbon substrate material. To accomplish this, one desires a means of maintaining a stable physical matrix even for carbon substrates that would otherwise be prone to melting and flow, as opposed to curing and cross-linking. Such a stabilizing would be useful for fusible and volatilizable synthetic species of modest molecular weight, such as phenolphthalein, 1-aminoanthraquinone, fluorescein, pyromellitic diimide, and other synthetic organic molecules. A matrix-stabilizing method would also be useful for certain grades of natural materials, as, for example, when those grades are less prone to cure than other grades within a given materials class. It is known, for instance, that lower-molecular-weight saccharide species may foam considerably during carbonization, while polysaccharides such as cellulose may simply char with little or no foaming. It is also known that species such as tannins (molecular weight ca. <1,000 a.m.u.) and that at least some grades of organo-solv-derived hardwood lignins have a higher tendency to foam during carbonization than do at least some grades of Kraft-process-derived softwood lignins. The improved carbon materials of the present invention are be fabricated from relatively inexpensive, readily available and renewable precursor materials. The precursor materials have a relatively high char yield so as to yield an amorphous carbon material with the most desirable characteristics. Additionally, the precursor materials have a relatively low foaming characteristic upon heating, so as to yield an amorphous carbon material with the most desirable characteristics. It will be appreciated that advances in the ability to control product carbon porosity and microporosity characteristics by manufacturing methods offer advantages not just for carbons employed in lithium ion rechargeable cells, but also for carbons in other carbon-based applications for which porosity characteristics are important. Examples of these other applications include electrochemical cells based on other chemistries and configurations, including capacitors, fuel cells, sensors, electrolytic cells, photovoltaic cells, and other types of cells. Examples of potential applications beyond energy storage purposes would include carbon-based media for fillers (e.g., carbon black), filters, adsorbants, absorbants, and inks.

Referring now to FIG. 1, there is illustrated therein a schematic representation of an electrochemical cell 10, such as a battery or an electrochemical capacitor, that includes a carbon electrode material fabricated in accordance with the instant invention. The electrochemical cell 10 includes a negative electrode or anode 20, a positive electrode or cathode 30, and an electrolyte 40 disposed therebetween. The cell negative electrode 20 is fabricated of an amorphous carbon material such as that described in greater detail hereinbelow. The positive electrode 30 of the cell 10 may be fabricated from a lithiated transition metal oxide such as is well known in the art. Alternatively, the positive electrode material may be fabricated of a material such as that described in commonly assigned, U.S. Pat. No. 5,591,548, dated Jan. 7, 1997, in the name of Mao, et al., and entitled "POSITIVE ELECTRODE MATERIALS FOR RECHARGEABLE ELECTROCHEMICAL CELLS AND METHOD OF MAKING SAME" the disclosure of which is incorporated herein by reference.

The electrolyte 40 disposed between the electrodes may be any of the electrolytes known in the art including, for example, $LiClO_4$ in propylene carbonate or a polyethylene oxide impregnated with a lithiated salt. The electrolyte 40 may also act as a separator between the positive and negative electrodes. The electrolyte may be aqueous, non aqueous, solid state, gel, or some combination thereof. Alternatively, the electrolyte material may be fabricated in a manner such as that described in commonly assigned U.S. Pat. No. 5,658,685, in the name of Oliver, et al and entitled "BLENDED POLYMER GEL ELECTRODES," issued Aug. 19, 1997, the disclosure of which is incorporated herein by reference.

In accordance with the instant invention, there is provided a method for making carbon materials for use as an electrode in an electrochemical cell such as that shown in FIG. 1. The carbon materials are substantially amorphous, although it will be appreciated that they could be partially or completely crystalline or amorphous but possessing crystalline inclusions. They may further include an amount of one or more modifier materials. The exact nature of the modifiers is dependent upon the specific application contemplated. Instead of the multi-functional or difunctional monomers or chars known in the prior art, the instant invention uses lignin as a starting material. Lignin is a by-product of the pulp and paper industry, and, as will be described in greater detail hereinbelow, can yield an amorphous carbon material with capacities in excess of 500 milliampere hours per gram (mAh/g) and a yield in excess of 50%. Since lignin is generated at a rate of over 50 million metric tons a year, using lignin as a starting material to make an amorphous carbon electrode for rechargeable electrochemical cells provides a tremendous economic advantage. Moreover, lignin is a renewable source; its existence in the biosphere is estimated to be $3 \times 10^{11}$ metric tons with an annual biosynthetic rate of $2 \times 10^{10}$ tons per year.

There are several types of lignin defined by relatively small variations in the chemical structure. The chief distinctions between lignins are: hardwood lignin versus softwood lignin; the type of chemical pulping used to remove the lignin from raw wood; and subsequent chemical modifications. The type of lignin described for use herein is a byproduct of relatively soft wood, specifically Southern Yellow Pine. The chemical pulping process used to isolate the lignin is known as the "Kraft process". The Kraft process uses aqueous mixtures of sodium sulfide and sodium hydroxide to separate the cellulosic fibers from the lignin material. The degree of oxidation and/or degradation of the obtained lignins varies with the choice of the pulping process. Indeed, lignin exhibits slow, spontaneous oxidation and degradation even upon prolonged exposure to air. However, lignin products from the various pulping methods are substantially similar for purposes of the pyrolysis process described herein.

Other common pulping processing include the "green liquor" process that is usually used for the so-called hardwoods and that comprises treatment of the product with aqueous sodium carbonate and sodium sulfide; the acid sulfite process employing an aqueous sulfite salt of calcium, magnesium, sodium, or ammonium; mechanical and thermal mechanical pulping; and organo-solv pulping wherein an organic solvent is substituted for some or all of the water used in the aqueous methods.

The lignin used herein is a product of organo-solv pulping, with resulting low inorganic content, low melting point, and high foaming characteristic during carbonization. The organo-solv lignin has a molecular weight of approximately 1000.

The lignins described herein include 3 cinnamyl alcohols. These alcohols are the monomeric precursors of the lignin and include p-coumaryl alcohol, coniferyl alcohol and sinapyl alcohol. The structural units of each of the three cinnamyl alcohols have oxyphenyl propyloxy skeletons, and differ from each other only in the number of methoxyl groups attached to the benzene ring. In the polymeric structure of lignin, these structural units are held together by a variety of ether and carbon/carbon bonds.

The biogenesis of lignins proceeds through the Shikimic acid pathway; thus, the same or similar hydroxyphenyl propenyl intermediates found in lignin are also present in other products which are the result of that acid pathway. Examples of such materials include flavanoids, suberin, betalains, coumarins, sporopollenins, and certain amino acids such as tyrosine, tryptophan and phenylalanine. Further, the oxyphenylpropyl backbone units characteristic of the cinnamyl alcohols described hereinabove can also be found in the first stages of decomposition of most carbon based botanical matter. Specifically, the humic substances such as humic acid, folic acid, and humin as well as cerogens may be useful. In addition, chemical degradation products of lignin, such as Hibberts ketones, also have this useful structure. Accordingly, while the preferred material described herein is the result of pyrolysis of lignin, it is to be understood that the invention is not so limited. Rather, the invention disclosed herein relates to amorphous carbonaceous materials which are the result of pyrolysis of products of the Shikimic acid pathway and, in particular, substances possessing an oxyphenyl propyloxy backbone unit.

Figure 2:
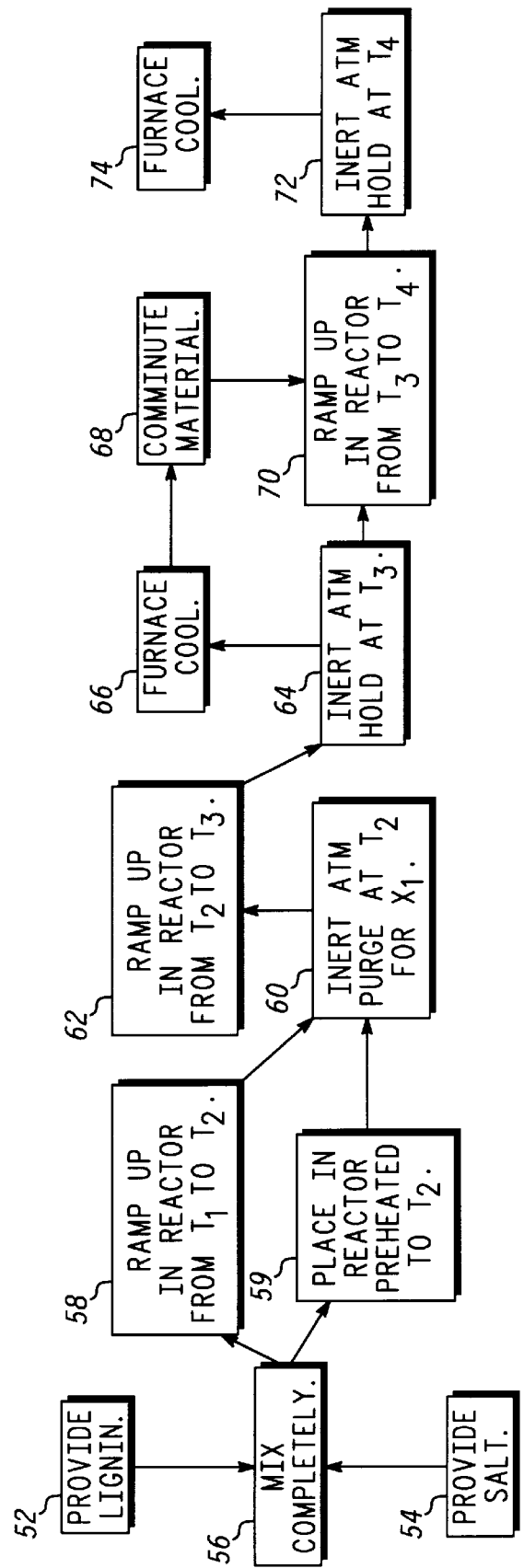
FIG. 2 is a flowchart illustrating the steps for preparing a carbon material in accordance with the instant invention.

Referring now to FIG. 2, there is illustrated therein a flowchart of the steps necessary to fabricate an amorphous carbon material in accordance with the instant invention. The flowchart 50, at Box 52, illustrates the first step of the fabrication process and specifically the step of providing the lignin material. The lignin material provided at Box 52 is similar to that described hereinabove or, alternatively, may be any other of the other materials described herein.

Illustrated at Box 54 is the step of providing the lignin material with a salt. Shown at Box 56 is the step of thoroughly mixing the lignin material and the provided salt. It has been found that, when the lignin material is heated in the presence of a salt, the reaction of the lignin is more complete and results in decreased foaming, improved yield and improved electrochemical performance of the final product. Lower quantities of off-gases also reduce the cost of scrubbing reaction by-products from effluent gasses. The choices of anion and cation are not limited only to those whose pyrolysis end products are electrochemically desirable in the cell, since unwanted residual salts may optionally be leached out, oxidized, or otherwise treated following the pyrolysis process. Two categories of salts have been found to be especially beneficial in the invention, although this invention is not so limited: salts from outside these two categories may be used, as well.

In the first category, the salt is capable of forming hydrogen bonds with the organic carbon precursor. Hydrogen bonding is a well-established phenomena between hydric protons and anions with low electronegativity (cf. C. Reichardt, *Solvents and Solvent Effects in Organic Chemistry*, 2nd ed., VCH Verlagsgesellschaft mbH, New York, N.Y., 1990, and references therein). The high thermal stability and low volatility of these salts relative to non-ionic organic compounds is believed to provide a more infusible matrix of hydrogen bonds, thus increasing the melting temperature of the organic component of the mixture, and also increasing its viscosity in a corresponding way. It is believed that the increased viscosity is the cause of reduced foaming of the carbonization substrate during curing, which reduces pore size in product carbons. It has been shown in the literature that at least some carbons exhibit superior lithium storage capacity if the pore size is below ca. 15 Å, apparently because solvent molecules are inhibited from entering smaller pores, whereas larger pores are thought to provide more opportunities for electrolyte solvent molecules to be adsorbed, decomposed, and desorbed, resulting in detriment to the energy storage cell capacity (W. Xing, et al., *J. Electrochem. Soc.*, 143, (No. 11), 3482–3491).

Examples of anions preferred for the hydrogen-bond-forming class of salts in this invention include sulfate, sulfite, sulfide, carbonate, acetate, borate, bromide, chloride, fluoride, perchlorate, fluoborate, hexafluorophosphate, trifluoromethylsulfonate, bis(trifluoromethylsulfon)amide, tris(trifluoromethylsulfone)methide, and borate. Examples of cations preferred for this class of salts include tetra-alkyl ammonium cations, tri-alkyl sulfonium cations, and cations of alkali metals such as Li, Na, K, Mg, and Ca. Such salts have been found in this invention to reduce foaming in otherwise highly flowable melts of carbonization substrates.

In the second category of especially useful salts are those capable of polymerizing to form a solid matrix that prevents flow or foaming of heatsoftened carbon precursor materials. Polymerization is defined here as the condensation or chain reaction of reactive species (monomers) to form a larger molecule containing two or more "mer" units. Although there are examples of salts that can both form hydrogen bonds and also have one or more ions that can polymerize, the polymerization criteria involves a very different behavior from that cited for the first category above. The polymerizable salt approach is believed to derive its effectiveness from chain formation by monomer during an early phase of heating to create a solid matrix with immobilized morphology. For acrylates, the matrix is thought to be randomly oriented, favoring formation of amorphous high-capacity carbons; ionic functionalities would then act as an extensive network of physical cross-links. Such a stiff matrix hinders foaming, and allows formation of only small microcells during off-gasing. In addition, the shrinkage common to bulk polymerization of monomers is a further stricture against expansion and foaming by the lignin melt. Non-ionic monomers could be used to accomplish some of the same ends achieved by the invention, but in many cases they evaporate prior to reaching temperatures needed for spontaneous polymerization. Salts of polymerizable species have melting and boiling points higher than those of their non-ionic counterparts by hundreds of degrees Celsius, and salts enhance chelation and nucleophilic attack of other components.

It is noted that many ionic monomer salts are relatively inexpensive due to availability of commodity monomers, and this source of inexpensive reagent is important in ensuring the economic feasibility of this process. However, cost alone is not the only consideration: polymerization rate, ease of mixing with lignin, decomposition temperature, and other factors are also important. Examples of preferred polymerizable salts are: sodium methacrylate; sodium 4-styrenesulfonate; lithium methyl-4-oxy-benzoate; N-methyl-4-vinylpyridinium sulfate; $\alpha,\alpha'$-bis (tetrahydrothiophenio)-xylene dichloride; allyl trimethylammonium chloride; and sodium acetylide. While either an appropriate initiator (such as azobis(isobutyronitrile), benzoyl peroxide, or a dialkyl peroxide) or a coordination catalyst (such as a robust ring-opening metathesis polymerization catalyst, such as titanium (IV) chloride, the Tebbe catalytic reagent complex, or a ruthenium compound such as is used to catalyze metathesis polymerizations in aqueous solutions) might be added to reduce the polymerization time, depending upon the monomer and reagents chosen, the polymerization can proceed thermally without it. Of course, there are numerous classes of polymerization mechanisms, and ionic monomers are found in several of these classes: the polymerizable salts of the invention are not limited to those mechanistic categories specifically implied here, since many variations and combinations of monomer ions and or reagents will suggest themselves to those skilled in the art.

It is to be understood that the two classes of salts outlined above are not limiting in this invention. Additional taxonomic schemes may be proposed for identifying other classes of salts useful for forming a mechanically intransigent media in combination with organic carbonization substrates. For instance, nucleophilic attack upon or by ionized acrylates or other ionized monomers interacting with lignin may also occur with a beneficial effect. Such nucleophilic or electrophilic behavior may be found both among salts that comprise a polymerizable ion, and among those salts that do not comprise such an ion; and both among ionic species that can form a hydrogen bond, and among those that cannot.

The choice of salts may be guided by a variety of other factors. For instance, the desired final metals composition of the product carbon is a consideration. During heating for carbonization, sodium salts decompose to form metallic sodium, which is carried away by boiling or sublimation in the vapor phase, whereas lithium salts held in the same temperature range are observed to form non-volatile lithium oxide and other refractory lithium compounds.

Referring again to FIG. 2, Box 56 illustrates the step of thoroughly mixing the lignin and the salt. One or more salts can be added to and mixed with or generated by reaction of the carbon precursor with a chemical reagent. Mixing methods may be carried out by any of several means that will suggest themselves to those skilled in the art, such as by a blender, a ball mill, a jar mill, spray-drying, co-extrusion, solvent casting, reaction of acids and bases, reaction of nucleophiles with electrophiles, electrostatic powder coating, etc. The salt may be present in amounts between 1 and 25 wt %. Once thoroughly mixed, the lignin/salt mixture is ready for the pyrolysis or carbonization process. Example of a salt formed by reaction of the carbonization substrate with a chemical reagent would be the mixture of natural phenolic compounds such as lignins or tannins with methyl iodide and lithium hydroxide base to obtain methylated phenols, water, and lithium iodide salt in an intimate mixture.

The heating temperatures used in the pyrolysis/carbonization process can be determined by thermogravimetric analysis (TGA) and differential scanning calorimetry (DSC), which have generally indicated that the pyrolysis/carbonization process is preferably carried out as a two-phase heating process, though to use two steps in heating is not absolutely necessary. During carbonization most oxygen and hydrogen present in the original starting materials is lost, and the bulk of the carbonaceous material is transformed into molecular planes of high mass, characterized by extensive conjugation and fused aromatic ring structures: these planes may or may not form parallel stacks. Generally it is necessary to achieve temperatures approaching ca. 700° C. or more in order to achieve carbonization; 1000° C. is often a more preferred maximum range for amorphous carbons, while ca. 2000° C. is preferred for graphites.

The scale of the reaction including sample size, equipment capacity and other engineering considerations will determine the optimal parameters of treatment. Herewith is described a set of conditions preferred for reaction of ca. 250 g sample in a three-inch diameter ceramic tube furnace (model # STF55321C: 240V, 1850W, 8A, 50/60 Hz, single phase, 1100° C. maximum; Lindbergh/Blue M, 275 Aiken Road, Asheville, N.C., 28804, (800) 438-4851). The mixture of lignin and salt is placed in a furnace or reactor which is held at temperature $T_1$ or essentially room temperature. Thereafter, the furnace is ramped from room temperature up to a temperature $T_2$ which is generally between 100 and 150° C., and preferably about 120° C. This step is illustrated at Box 58 of the flowchart. Alternatively, as is illustrated in Box 59, the reactor may be preheated to temperature $T_2$. After placing the mixture of lignin and salt in the oven, and reaching temperature level $T_2$, the atmosphere inside the reactor is purged with an inert gas so as to yield an inert atmosphere as illustrated by Box 60. Examples of an inert atmosphere used in connection herewith include argon, nitrogen, $CO_2$, hydrogen, and helium. In a preferred embodiment, the inert atmosphere is argon.

After flooding the reactor in an inert atmosphere, the temperature inside the reactor is ramped up from the $T_2$ level to a $T_3$ level. The $T_3$ temperature is typically the temperature at which the lignin, or the lignin mixture, is fully cured, such as between about 300° C. and 400° C. Preferably, the $T_3$ temperature is approximately 350° C. The rate at which the temperature is ramped from $T_2$ level to the $T_3$ level is typically between 0.1 and 5° C. per minute, preferably 0.5° C. per minute. This step is illustrated in Box 62 of the flowchart. The mixture is held at the $T_3$ temperature for a period of time of between three and twelve hours, preferably approximately six hours. This step is illustrated at Box 64 of the flowchart.

Thereafter, illustrated at Box 66, the lignin, or the lignin mixture, is optionally cooled to room temperature, such as by turning off the furnace or reactor in which the mixture has been heated, and comminuted, illustrated at Box 68. The material may be comminuted to a particle size of approximately less than 100 microns, preferably between 5 and 50 microns. Comminution may be carried out via conventional grinding techniques that are well known to those of ordinary skill in the art and need not be done in an inert atmosphere. For example, the material can be ground by jet milling, hammer milling, ball milling, use of mortar and pestle, etc. It will be appreciated that the cooling step of Box 66 and comminution step of Box 68 need not be performed when it is not desired to handle the material as a powder at the second phase of heating.

Referring now to Box 70, the comminuted material is returned to the furnace or reactor, and the temperature in the over is ramped up to the $T_4$ temperature level. The $T_4$ temperature level is preferably between approximately 800° C. and 1200° C. and most preferably about 1000–1020° C. The temperature is ramped up to the $T_4$ level at a rate of approximately 1–5° C. per minute and in a three-inch ceramic tube furnace preferably 2.5° C. per minute. Thereafter, as is illustrated in Box 72, the comminuted mixture is held at the $T_4$ level in an inert atmosphere for a period of time of between 0.5 and 5 hours and preferably about 1 hour. Thereafter, as shown in Box 74, the reactor or furnace is turned off and the mixture is again allowed to cool to room temperature. Cooling typically occurs in 4–6 hours time. Box 76 illustrates a comminution step after cooling from $T_4$; this comminution is typically done if the sample was not milled between the two heating steps represented by thermal maxima at $T_3$ and $T_4$.

The pyrolysis/carbonization process described hereinabove with respect to FIG. 2 is a two-temperature process. Optionally the lignin and salt mixture is heated at a relatively low temperature, $T_2$, which results in the dessication of the lignin material to drive off water vapor and undesired low-boiling aliphatics. The lignin-salt mixture is characterized by relatively high char yield and relatively low foaming in the first (i.e., $T_3$) step, resulting in a smaller amount of aliphatic by-product materials to be driven off, as well as less boil off. Thereafter, the lignin-salt mixture is optionally comminuted after it has fully cured at the $T_3$ level. Upon further heating as at the $T_4$ level, the condensed, comminuted lignin product decomposes and forms carbon. It is hypothesized that a variety of carbon—carbon bonds are formed between the phenyl rings in the lignin precursor materials to generate carbon features with extended aromatic planes. As noted above, the lignin material is phenolic, resulting in high reactivity in cross bonding of the phenyl rings.

In some cases, the presence of residual ions from a co-pyrolysis salt or salts may be advantageous to reduce foaming, but disadvantageous for subsequent electrochemical performance of cells containing these electrode carbons. In such a case, salts or ionic components may be chosen that ultimately decompose to volatile species; examples include tetra-methyl ammonium cations and acetate anions. Or the salt or its residual byproducts may be leached out after the curing or carbonization step, if desired.

In prior art processes for forming carbon, the precursor material is heated until a hard block of carbon is formed, which is then ground, such as by jet milling. To the degree that foaming is controlled by the operator in that art, the tools used are modulation of heating rate and or gas flow to low levels. However, materials with a substantial tendency to foam are unattractive as precursors for that art both because the highly porous product has poor electrochemical performance, and because excessive expansion of the pyrolysis substrate in the furnace presents logistical difficulties. The process according to the present invention, on the other hand, incorporates a heat-stable additive (i.e., one or more salts) that enhances the mechanical strength of the medium for the carbon precursor until at least such time as it cures. As a result, expense arising from slow heating rate and or rapid flow of inert gas can be reduced. Furthermore, inexpensive and otherwise attractive organic materials can now be made much easier to handle that would otherwise foam or "balloon" to a high degree during carbonization: preferred examples of materials that would otherwise foam include organo-solv lignin, tannins, flavonoids, polyhydric alcohols, phenolphthalein, and alkylated polysaccharides.

The material resulting from the process illustrated in FIG. 2 may also be subjected to a secondary treatment. For instance, when the particle size of the resulting amorphous carbon material needs to be still smaller, the previously ground amorphous carbon material can be further comminuted to a smaller particle size. As mentioned above, the particle size of the carbon material is preferably between 5 and 50 microns. Another optional secondary treatment comprises mixing the comminuted amorphous carbon material with a lithium containing component or lithium salt consisting of $LiNO_3$, $Li_3PO_4$, $LiOH$, $Li_2SO_4$, $Li_2CO_3$, lithium acetate, and combinations thereof. One preferred lithium containing compound with which the comminuted amorphous carbon material can be mixed is $LiNO_3$. Thereafter, the mixture of the comminuted amorphous carbon material and the lithium containing compound can be subjected to a heat treatment process. This heat treatment process comprises heating the mixture under inert atmosphere, preferably argon, at temperatures between 500° C. and 1200° C. and preferably between 600° C. and 800° C. The period of time for this heat treatment is approximately between 8 and 20 hours, with 12 hours being preferred.

Figure 3:
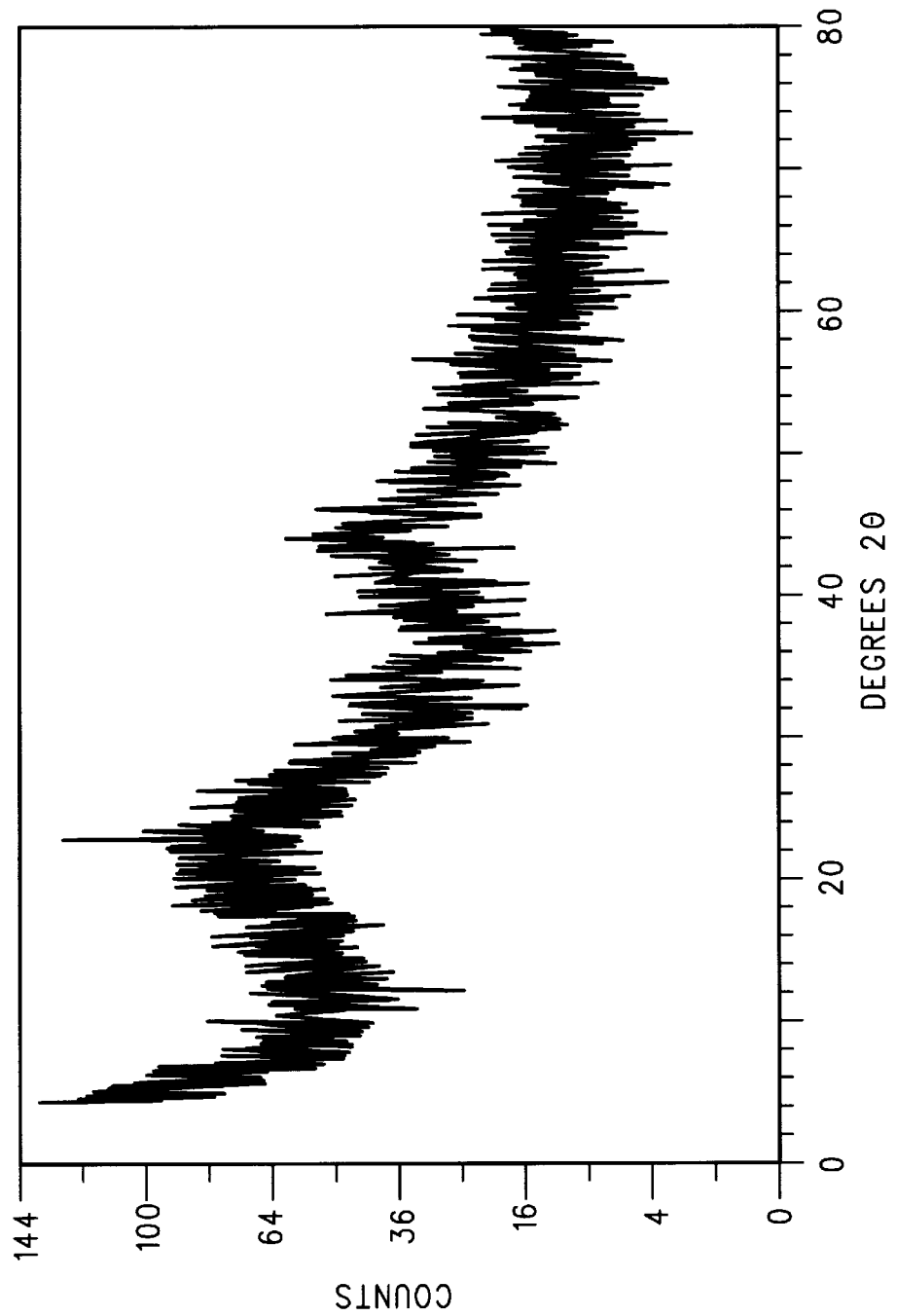
FIG. 3 is an x-ray diffraction analysis for a carbon material fabricated in accordance with the instant invention, derived from a carbonization substrate consisting of an organosolv lignin to which had been added 6.8 wt % sodium sulfate.
Figure 4:
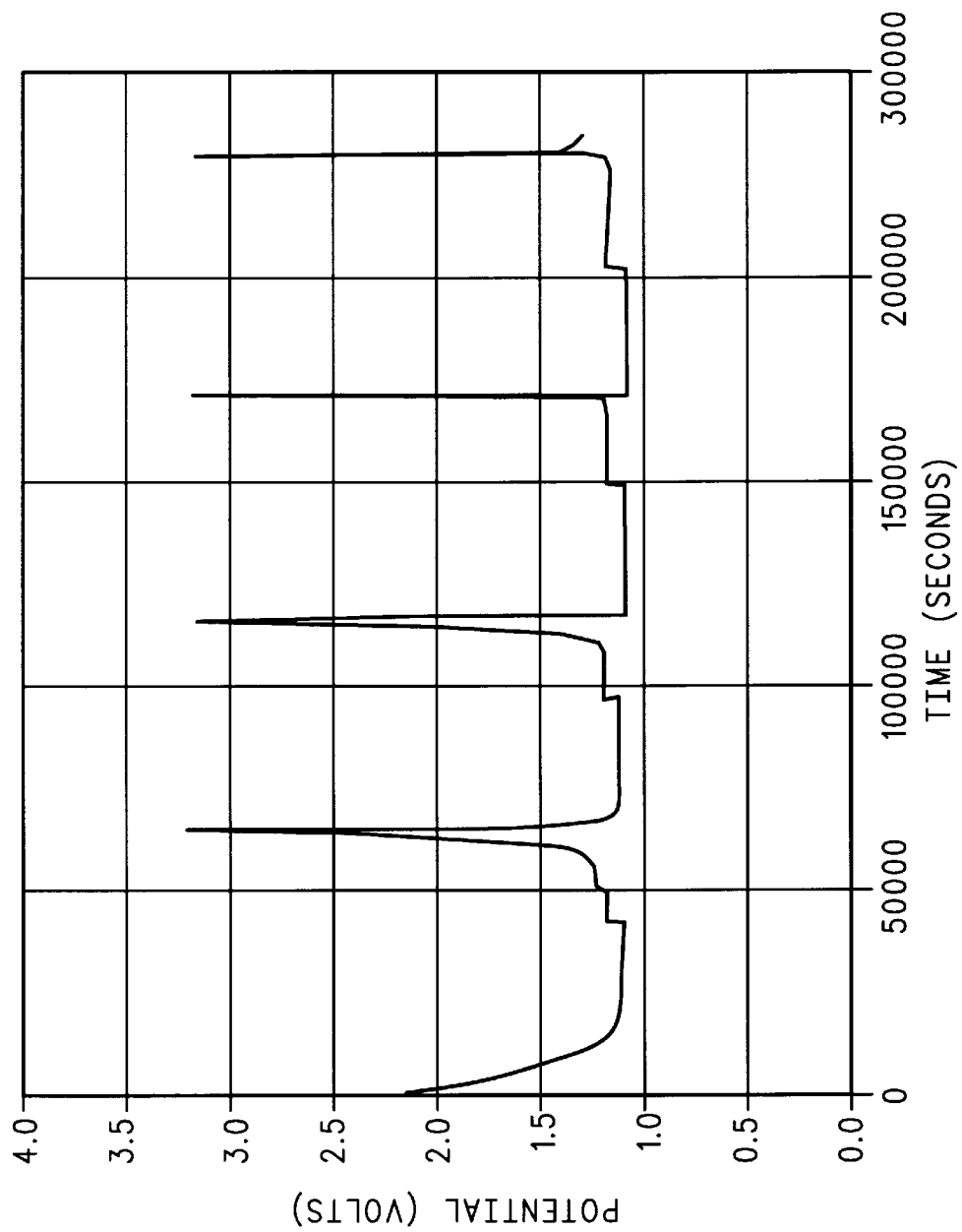
FIG. 4 is a plot of the first four electrochemical cycles for a carbon material fabricated in accordance with the instant invention, derived from a carbonization substrate consisting of an organosolv lignin to which had been added 6.8 wt % sodium sulfate. The carbon was cycled versus a lithium metal counterelectrode, but the perceived voltage was ca. 1.2V higher than actual potential due to the voltage sense being held in series with a nickel metal hydride cell. The solid line represents the measured voltage during charge and discharge. The cycling was carried out under constant current and was terminated by a one-hour rest step after the fourth cycle.

The material resulting from the process illustrated hereinabove with respect to FIG. 2 is a substantially amorphous material which is characterized by a d-spacing of the (002) peak of between 3.8 angstroms and 4.2 angstroms. The true density of this material is on the order of approximately <1.6 g/cm³ up to approximately 2.2 g/cm³. FIG. 3 shows an X-Ray diffraction spectrum from a typical sample made according to the invention. The reversible capacity of the material disclosed herein is typically in excess of approximately 470 mAh/g. The first-cycle efficiency typically ranges between about 68 and 78%. Foaming is typically reduced or almost eliminated. FIG. 4 depicts a typical charge-discharge cycle.

The instant invention may be understood by the examples provided below.

Example I 6.8 g of sodium sulfate (cat. no. SX0763-1, EM Science, 480 Democrat Road, Gibbstown, N.J. 08027, USA, (609) 354-9200) dissolved in ca. 100 mL water, was added to 93.2 g of an organosolv hardwood lignin manufactured by Repap™ (cat. no. ATI/L nos. 1573 & 1574, from Alcell Technologies Incorporated, a subsidiary of Repap Technologies Inc., 2650 Eisenhower Ave., Valley Forge, Pa. 19482, (610) 630-9630), stirred well, and dried overnight at ca. 100° C. in a convection oven (Isotemp Oven model no. 655G, cat. no. 13-245-655G, Fisher Scientific, 711 Forbes Ave., Pittsburgh, Pa., USA 12519-4785, (412) 562-8300), then milled for ca. 30 min. by an electrically driven agate mortar and pestle (laboratory mortar grinder, Type RM-0: Retsch, Rheinische Str. 367, POB 15 54, W-5657 Haan1, West Germany, Tel. (0 21 29) 55 61 0). The weight of salt used was calculated to result in 5 weight % sodium in the final carbon, assuming the yield would be ca. 45 weight % yield of carbon from an unadulterated organic fraction.

The carbons were made by weighing ca. 5 g of Repap™ mixture with sodium sulfate as described above into a 4-inch long, ½-inch deep, ½-inch top width ceramic crucible (Alundum™ combustion boat, 91% aluminum oxide, max. temp. 1450° C., cat. no. 22810-081: VWR Scientific, 1310 Goshen Parkway, West Chester, Pa. 19380, USA, (610) 431-1700), tamping it down lightly, and placing the boat into the center of a 1-inch diameter quartz tube (22 mm i.d., 23.5 o.d., 2-foot length: Quartz Plus Inc., 27 Westview Road, Brookline, N.H. 03033, USA, (603) 673-5690) and placing the loaded tube into a 1-inch tube furnace (model no. TF 55035A: 120V, 800W, 7A, 1100° C. max. temp.; Lindbergh/Blue M, 275 Aiken Road, Asheville, N.C., 28804, (800) 438-4851) under an argon atmosphere; the interior of the quartz tube was protected by a liner made in-house, consisting of a cut sheet of milled graphite that had been pre-baked under a flow of argon to remove any volatiles (the graphite sheet was purchased as "Grafoil™", grade GH™B, 5 mil thickness, manufactured by UCAR Carbon Co., distributed by Ameraflex Rubber & Gasket Co., Inc., 317 Georgia Ave., Deer Park, Tex. 77536, U.S.A., (800) 522-7325). The heat was ramped in the following manner: at 2° C./min. from room temperature to 350° C., dwelling at that temperature 1 hour, cooling ambiently at 5° C./min., then re-milling the substrate for ca. 30 min. to comminute it to an average particle size of ca. 45 μm, then sieving it (mechanical shaker model no. RX-29, type ROTAP: W. S. Tyler, 8570 Tyler Blvd., Mentor, Ohio 44060, USA, (800) 321-6188); (U.S. Standard Testing Sieves, 0.0017 inch mesh size, "no. 25", VWR Scientific, 1310 Goshen Parkway, West Chester, Pa. 19380, USA, (610) 431-1700). The resultant powder was heated again under argon, ramping up at 5° C./min. to 1030° C., dwelling at that temperature 1 hour, then cooling at 5° C./min by ambient cooling. The high temperature vaporized much of the sodium metal by-product, which was carried away and condensed at the cooler exit end of the graphite sheath in the quartz tube.

Whereas Repap™ without added salt typically has a carbon yield of 25 to 35 weight % relative to starting material by this process, the result with added sodium sulfate in this example was between ca. 40 and 45 weight % yield, with only modest foaming during the curing step.

X-ray diffraction analysis of the carbon material resulting from Example I is illustrated in FIG. 3 (Philips PW3020 Diffractometer, [220V, 85 kVA, 60 Hz], (800) 279-7297, Philips, Lelyweg 1, 7602EA Almelo, The Netherlands). The sample was scanned continuously in normal mode (θ/2θ), in 0.020 degrees2θ step size, from a starting degrees2θ angle of 5.000 degrees to a final degrees2θ angle of 80.000, with a scan time of 82.5 minutes for 3750 steps (1 second per step) and a scan speed of 0.020 degrees2θ/s, with maximum d-value of 17.65958 angstrom and the minimum d-value set at 1.19837 angstrom. The diffractometer setting was on POWDER mode, with 35 kV tension and 45 mA current. Wavelength Alpha1 was 1.54060 angstroms and Wavelength Alpha2 was 1.54439 angstrom. For the primary optics, no beta filter was used, the Soller slit was set at 0.04 rad, the divergence slit was set at 1 degree, and the beam mask was set at 10 mm. For the secondary optics: no collimator was used; the anti-scatter slit was set at degree; no beta filter was used; the receiving slit was set at 0.10 mm; the Soller slit was set at 0.04 rad; the PHD lower level was at 35% and the PHD upper level was at 80%.

Electrode films were made by manually grinding ca. 100 mg of the resulting carbon together with 5 weight % PTFE (cat. no. 18,247-8, Aldrich Chemical Co., 1001 West Saint Paul Ave., Milwaukee, Wis. 53233, USA, (414) 273-3850), then pressing the matted composite between sheets of aluminum foil (20 μm thick foil, All-Foils, Inc., 4597 Van Epps Road, Brooklyn Heights, Ohio 44131, (800) 521-0054 or (216) 661-0211) in a domestic pasta press (Atlas, Reg. Design No. 1048534, model 150 mm, made in Italy), then folding the resulting film upon itself and repeating the procedure reiteratively until a smooth uniform film was obtained; this final electrode stood up to manual handling well.

From this electrode sheet, 1 $cm^2$ circular disks weighing between about 9 mg and about 13 mg were cut with a common cork borer (with a cut-disk diameter in the range of ¼-inch to ½-inch) and evaluated in "half-cells". The half-cells consisted of electrochemical SwagelokTM tee-cells, those being comprised of union tee housings, ferrules, and nuts all fabricated from polytetrafluoroethylene (union tee kits, cat. no. E06379-64, Cole-Parmer, 625 East Bunker Court, Vernon Hills, Ill. 60061-1844, USA, (800) 323-4340, (847) 549-7600), with the housings were drilled out through the long axis to permit insertion of 0.5 inch diameter, stainless steel (304 or 316 grade), carefully washed and dried two-inch rods with smoothly machined, 90° angle-cut, flat ends as electrodes. The rods had been machined at the electrical lead end to provide a threaded hole to accomodate banana plug format and spade format electrical lead connectors. For the negative electrode a disk was cut from a lithium foil (FMC Corp., Lithium Division, 449 North Cox Road, Box 3925, Gastonia, N.C. 28054, (704) 868-5300), and affixed to the end of one rod to completely cover its surface, and the same was done for the reference electrode. For the positive electrode a carbon electrode consisting of a 1 $cm^2$ circular disk described above was dried in an inert atmosphere glove box at 200° C. for two hours, and was then placed concentrically upon a ½-inch-diameter disk of copper foil (12 μm thick foil, All-Foils, Inc., 4597 Van Epps Road, Brooklyn Heights, Ohio 44131, (800) 521-0054 or (216) 661-0211) that had previously been similarly dried, and the bare opposite surface of the copper disk was placed upon the end of a third stainless steel rod. Between the negative and positive electrodes were stacked three 0.5-inch diameter circular disks of "glass mat" ("glass microfibre filters", Whatman GF/D grade, cat. no. 1823 070, Whatman International, Limited, Maidstone, England) that had been previously been cut out of glass-fiber-based filter media with a cork borer and dried for 24 hours at 300° C. The electrolyte was an anhydrous commercial solution of ca. 40% ethylene carbonate, 30% diethyl carbonate, and 30% dimethyl carbonate containing 1M $LiPF_6$ (Tomiyama Pure Chemical Industries, Nikko Buildings, 5–7, Nihonbashi-Honcho, 2-chome, Chuo-ku, Tokyo, Japan). The negative and positive electrodes and "glass mat" were compressed toward each other, the respective ferrules and nuts for these two electrode rods were added and tightened to maintain the compression. An amount of electrolyte sufficient to wet all three electrodes port (ca. 0.6 mL) was added through the reference electrode port in the housing, then the internal circular lip in the reference port was optionally protected with one anhydrous glass mat disk, and then the reference electrode was inserted, making sure that electrolyte solution wetted the lithium on its end surface, followed by placement and tightening of the ferrule and nut for the reference electrode. All tee-cell assembly work was carried out in a helium-atmosphere glove box equipped with nitrogen-removing and oxygen-removing purifier beds. The nuts and housings of each half-cell were covered and wrapped tightly with strips of a waxy polyolefin film (Parafilm™: American National Can Co., Neenah, Wis. 54956, USA) to prevent air from passing in or solvent vapors from passing out through potential microscopic leaks around the ferrules.

The tee-cells were placed on a commercial cell cycling apparatus (model no. L6N4S-0.1-5: 0 to 5.0 V, 0.01 mA to 100 mA; Bitrode Corp., 1642 Manufacturer's Drive, Fenton, Mo. 63026, (314) 343-6112). All cycles were carried out at 0.6 mA current, and the carbon was lithiated (charged) to 680 mAh/g of active material in the first cycle, then delithiated (discharged) until the cell voltage attained 2V. In subsequent cycles the carbon was charged to 500 or 550 mAh/g of active material, then discharged until the cell voltage attained 2V. Capacity corresponding to plating of metallic lithium on the surface of the carbon was defined as the capacity during charge after the voltage reached a minimum; the minimum was usually below zero volts. Capacity corresponding to lithium stripping (corresponding only to removal of plated lithium from the surface of the carbon) was defined as the capacity during discharge prior to the voltage's minimum or (where there were multiple shallow minima), prior to its final minimum. Because the cell cycler detection circuits could not monitor negative voltages, the tee cell was connected in series with a charged primary cell, and the cycler channel's voltage leads were attached at either end of the series, while the channel's current and reference leads were attached only to the tee cell under test, then the known voltage of the static charged primary cell was subtracted out during calculations. Alternatively, the cycler's voltage leads to the reference electrode and or the carbon electrode were connected with reverse bias so that they would be perceived as positive when the cell voltage was actually negative. First-cycle efficiency was calculated by subtracting lithium stripping capacity during first-cycle discharge from both the charge and the discharge capacities, and then dividing the resulting discharge capacity by the resulting charge capacity. Reversible capacity was calculated by subtracting the second-cycle stripping capacity from the second-cycle discharge capacity.

When sodium sulfate (cat. no. SX0763-1, EM Science, 480 Democrat Road, Gibbstown, N.J. 08027, (609) 354-9200) was commingled with Repap™ organosolv lignin by this process, first cycle efficiency of the resulting carbon was 67–71% and reversible capacity was 470 to 475 mAh/g of active material; modest foaming was observed during the first heating step. The electrochemical cyclability of the material in a half-cell is illustrated in FIG. 4. The efficiency of the first cycle was substantially improved over the where salt had not been added, in which was observed first cycle efficiency of ca. 50%, and reversible capacity of 370 mAh/g of active material. Also, for the case where carbon was made in the absence of salt, the molten Repap™ material expanded by foaming to several times the original volume of the substrate powder.

Example II

Figure 5:
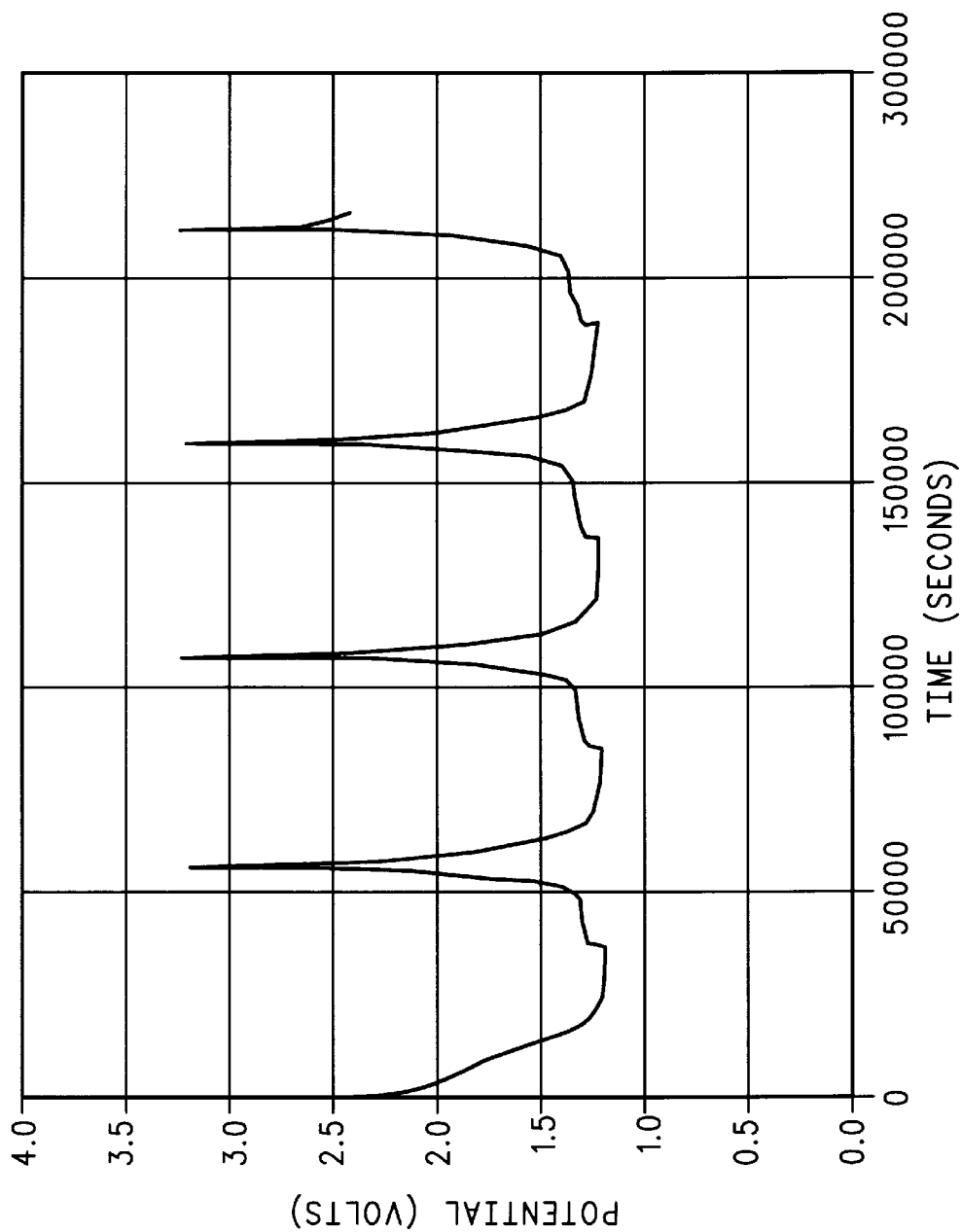
FIG. 5 is a plot of the first four electrochemical cycles for a carbon material fabricated in accordance with the instant invention, derived from a carbonization substrate consisting of an organosolv lignin to which had been added 6.8 wt % sodium sulfate, with carbonization being followed by desalination and dessication steps. The carbon was cycled versus a lithium metal counterelectrode, but the perceived voltage was ca. 1.2V higher than actual potential due to the voltage sense being held in series with a nickel metal hydride cell. The solid line represents the measured voltage during charge and discharge. The cycling was carried out under constant current and was terminated by a one-hour rest step after the fourth cycle.

A mixture was prepared, carbonized, and tested as described in Example I, with the exception that before testing the product carbon was washed in hydrochloric acid (cat. no. HX0604-1, EM Science, 480 Democrat Road, Gibbstown, N.J. 08027, (609) 354-9200) that had been diluted to a 1-molar aqueous solution with in-house distilled, de-ionized water. Ca. 100 mL of acid solution were used per 1 g of carbon to remove the sodium sulfate, then the powder was rinsed in de-ionized distilled water until the leachate was neutral, and then it was dried overnight at 100C. The first cycle efficiency of the final washed and dried carbon was ca. 60%, and the second cycle reversible capacity was ca. 470 mAh/g; FIG. 5 illustrates the electrochemical cycling performance of the material in half-cells.

Example III

Figure 6:
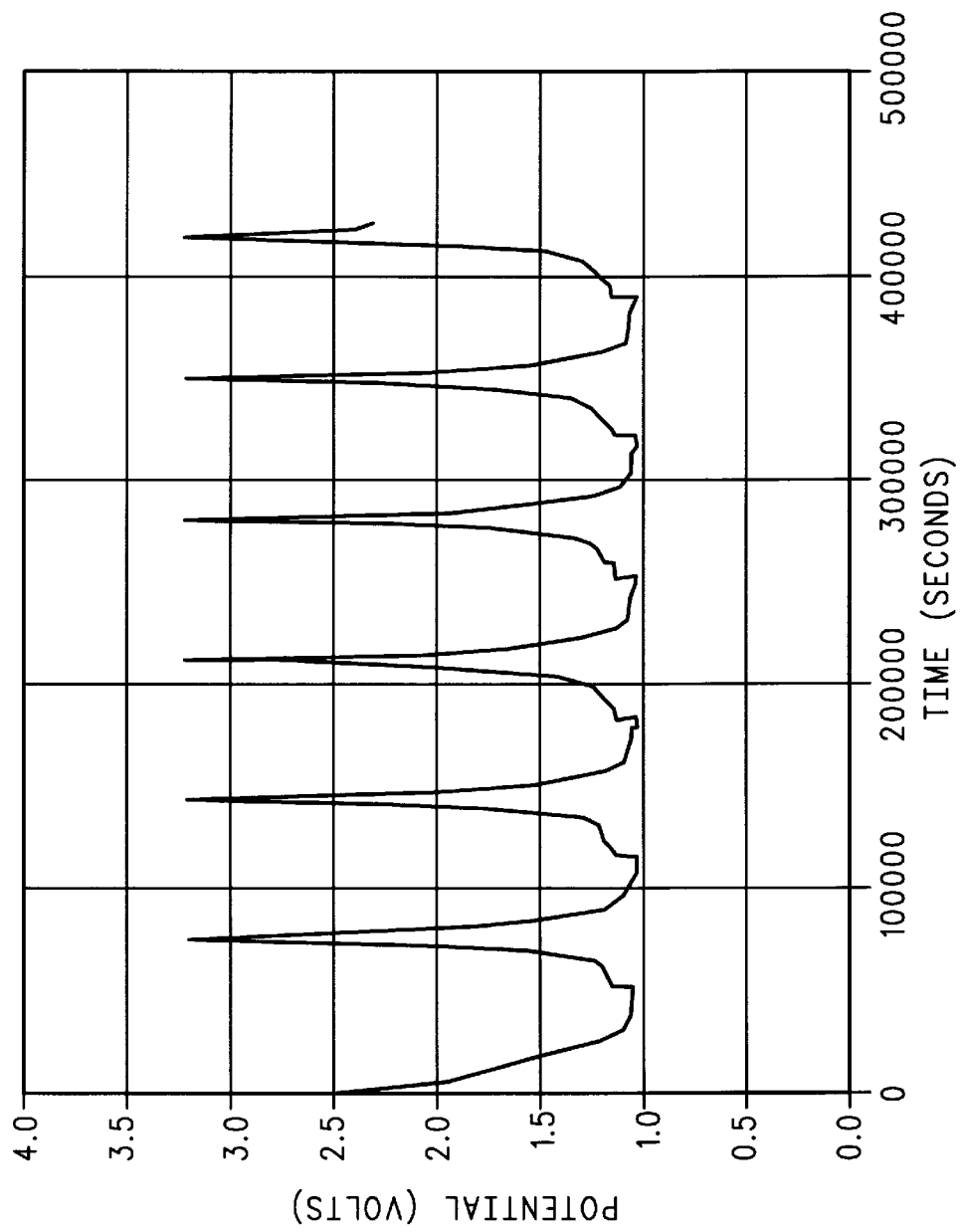
FIG. 6 is a plot of the first six electrochemical cycles for a carbon material fabricated in accordance with the instant invention, derived from a carbonization substrate consisting of an organosolv lignin to which had been added 6.8 wt % lithium sulfate. The carbon was cycled versus a lithium metal counterelectrode, but the perceived voltage was ca. 1.2V higher than actual potential due to the voltage sense being held in series with a nickel metal hydride cell. The solid line represents the measured voltage during charge and discharge. The cycling was carried out under constant current and was terminated by a one-hour rest step after the sixth cycle.

A mixture was prepared, carbonized, and tested as described in Example I, substituting lithium sulfate for sodium sulfate (lithium sulfate, anhydrous grade, 99.7% metals basis, cat. no. 13404, Alfa-Aesar, division of Johnson Matthey, 30 Bond St., Ward Hill, Mass. 01835, U.S.A., (800) 343-0660). The first cycle efficiency for the resultant carbon was 58.4% and the reversible capacity 435 mAh/g in the second cycle, improving to 473 mAh/g in the third cycle. FIG. 6 depicts this electrochemical cycling performance of the material in a half-cell. Char yields of carbon were comparable to those for the variation of the invention cited in Example I, foaming was somewhat more pronounced in Example III.

Example IV

Figure 7:
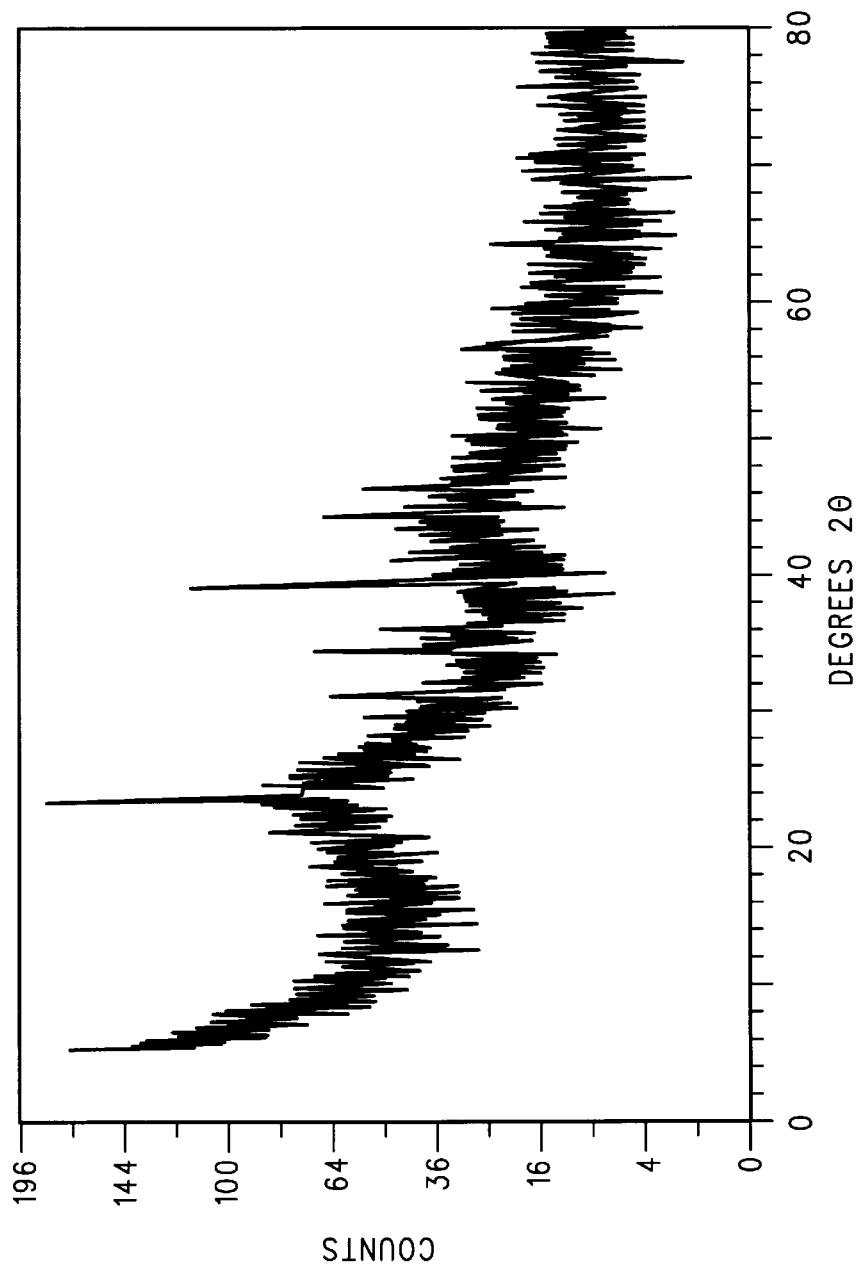
FIG. 7 is an x-ray diffraction analysis for a carbon material fabricated in accordance with the instant invention, derived from a carbonization substrate consisting of a Kraft process-derived lignin to which had been added 6.8 wt % sodium sulfate.

A mixture of lignin and sodium sulfate was prepared, carbonized, and tested as described in Example I, using instead of Repap™ organosolv hardwood lignin a softwood lignin product known as Indulin AT™ (purchased from Westvaco Chemical Division, Polychemicals Department, P.O. Box 70848, Charleston Heights, Charleston Heights, S.C. 29415-0848, (800) 845-1985). Indulin AT™ is synthesized by the Kraft process, and as received already contains a few percent of adventitious sodium sulfate as a residual by-product from its method of manufacture. The first cycle efficiency for the resultant carbon was ca. 70% and the reversible capacity was generally in the range of 450 to 460 mAh/g. Foaming in the added-salt mixture was low and comparable to that for the as-received lignin material. Yields of carbon were also comparable; the X-Ray diffraction spectrum is shown in FIG. 7.

Example V

Figure 8:
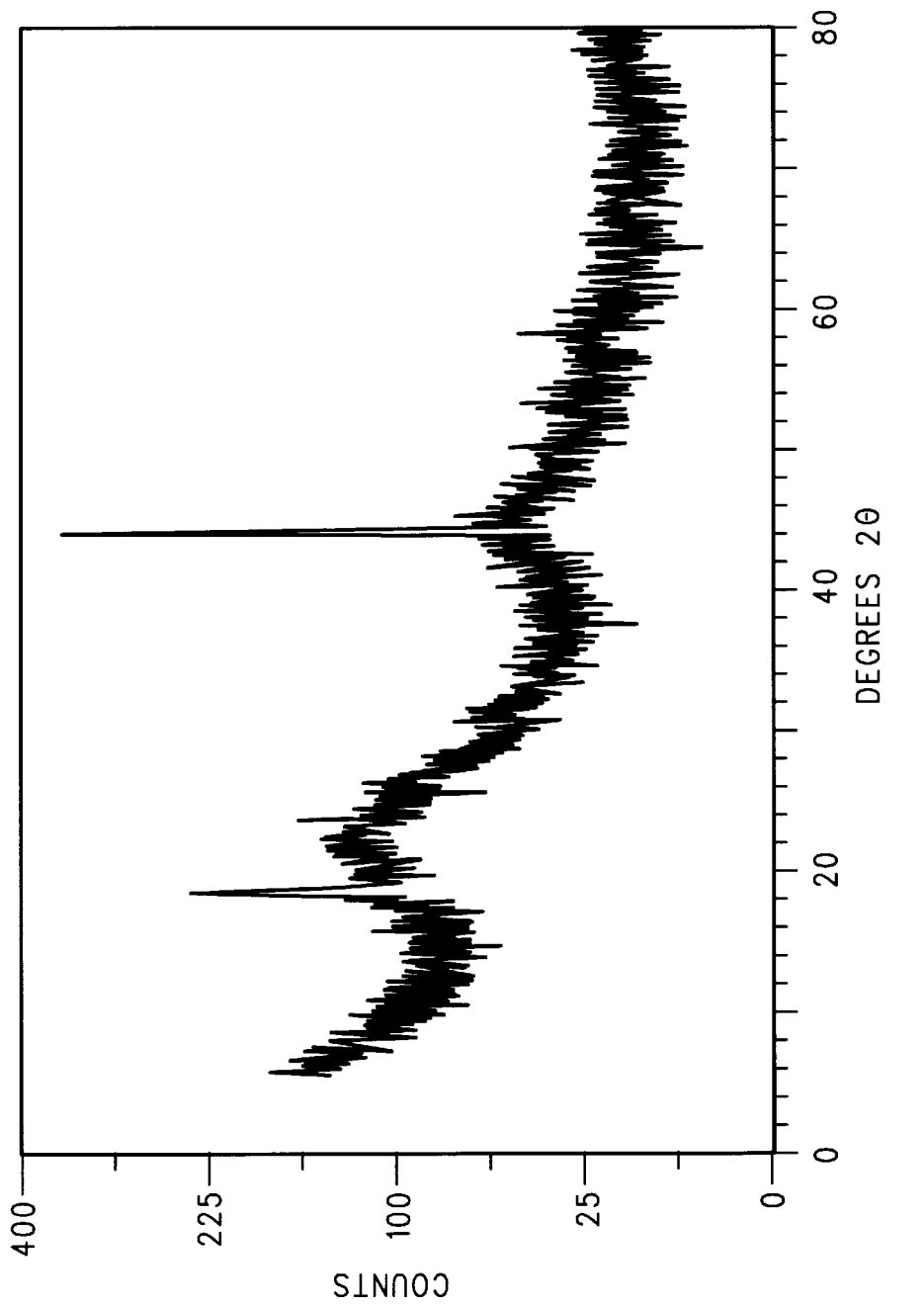
FIG. 8 is an x-ray diffraction analysis for a carbon material fabricated in accordance with the instant invention, derived from a carbonization substrate consisting of an organosolv lignin to which had been added 18 wt % of the sodium salt of acrylic acid; the sample contained 5 wt % poly(tetrafluoroethylene).

A mixture of 8.2 g Repap™ organosolv lignin and 1.8 g sodium acrylate (Acrylic acid, sodium salt, 99%, cat. no. 40,822-0, Aldrich Chemical Co., 1001 West Saint Paul Ave., Milwaukee, Wis. 53233, (800) 558-9160 or (414) 273-3850) was made in the manner described in Example I, then carbonized, as described in that example. It was calculated that the amount of salt used provided 13.4 weight % sodium metal in the final carbon; much of the sodium vaporized and was carried off during carbonization. Milling of the lignin and sodium acrylate was facile because the salt has a relatively soft and greasy texture. The X-Ray diffraction spectrum is depicted in FIG. 8.

Figure 9:
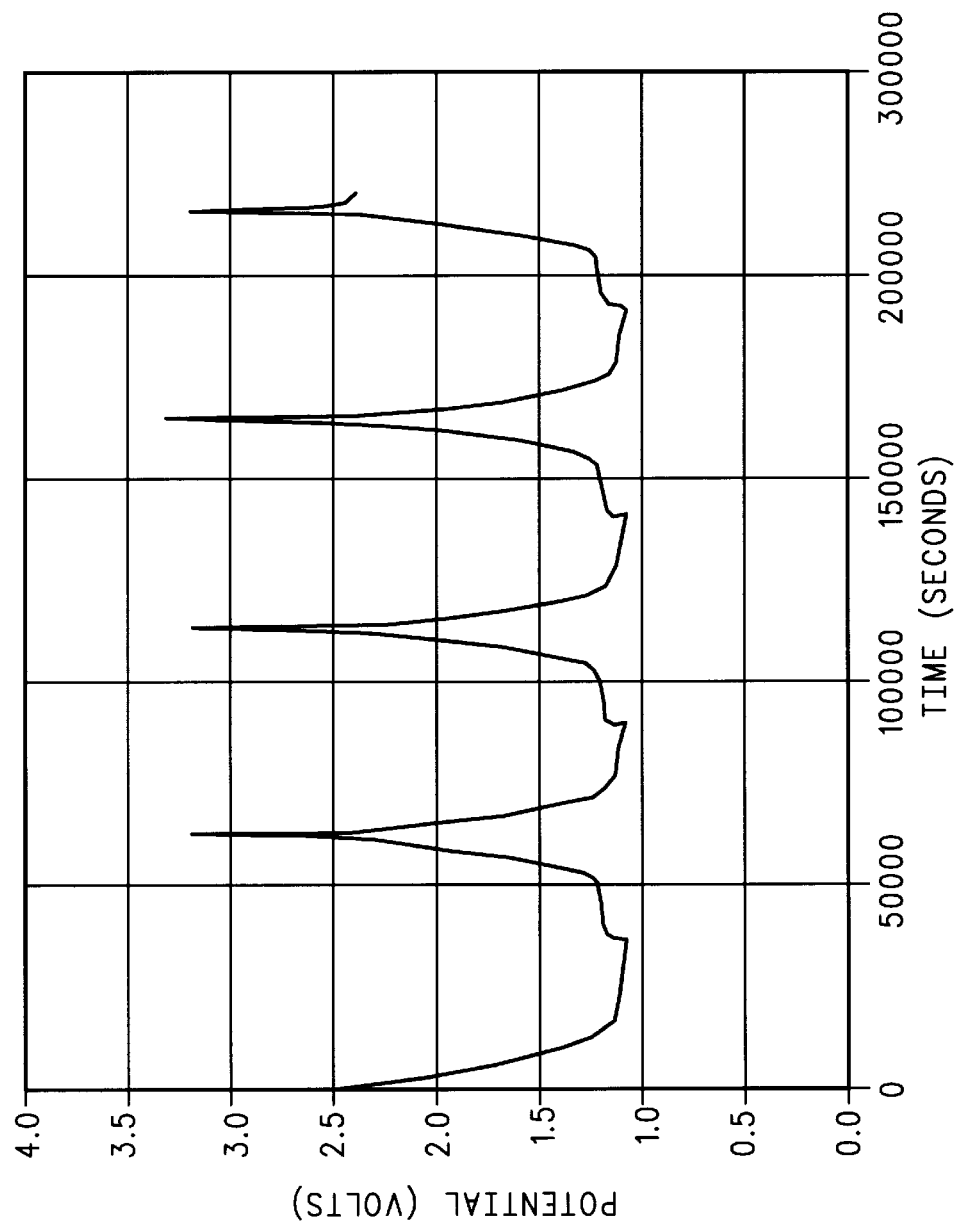
FIG. 9 is a plot of the first four electrochemical cycles for a carbon material fabricated in accordance with the instant invention, derived from a carbonization substrate consisting of an organosolv lignin to which had been added 18 wt % of the sodium salt of acrylic acid. The carbon was cycled versus a lithium metal counterelectrode, but the perceived voltage was ca. 1.2V higher than actual potential due to the voltage sense being held in series with a nickel metal hydride cell. The solid line represents the measured voltage during charge and discharge. The cycling was carried out under constant current and was terminated by a one-hour rest step after the fourth cycle.

The final carbon had first cycle efficiency of 78% and reversible capacity of ca. 520 to 550 mAh/g of active material, and did not foam visibly or expand during curing and carbonization; FIG. 9 depicts the cycling performance of the material in a half-cell. The excellent performance obtained demonstrated that the synthesis process provides a synergistic effect superior to the performance of carbons made from unadulterated Repap™ lignin described in Example I. When neat sodium acrylate was carbonized alone, mass yields were low (ca. 20%), as were resultant cycling efficiencies (ca. 60%) and reversible efficiencies (=400 mAh/g of active material).

Example VI

Figure 10:
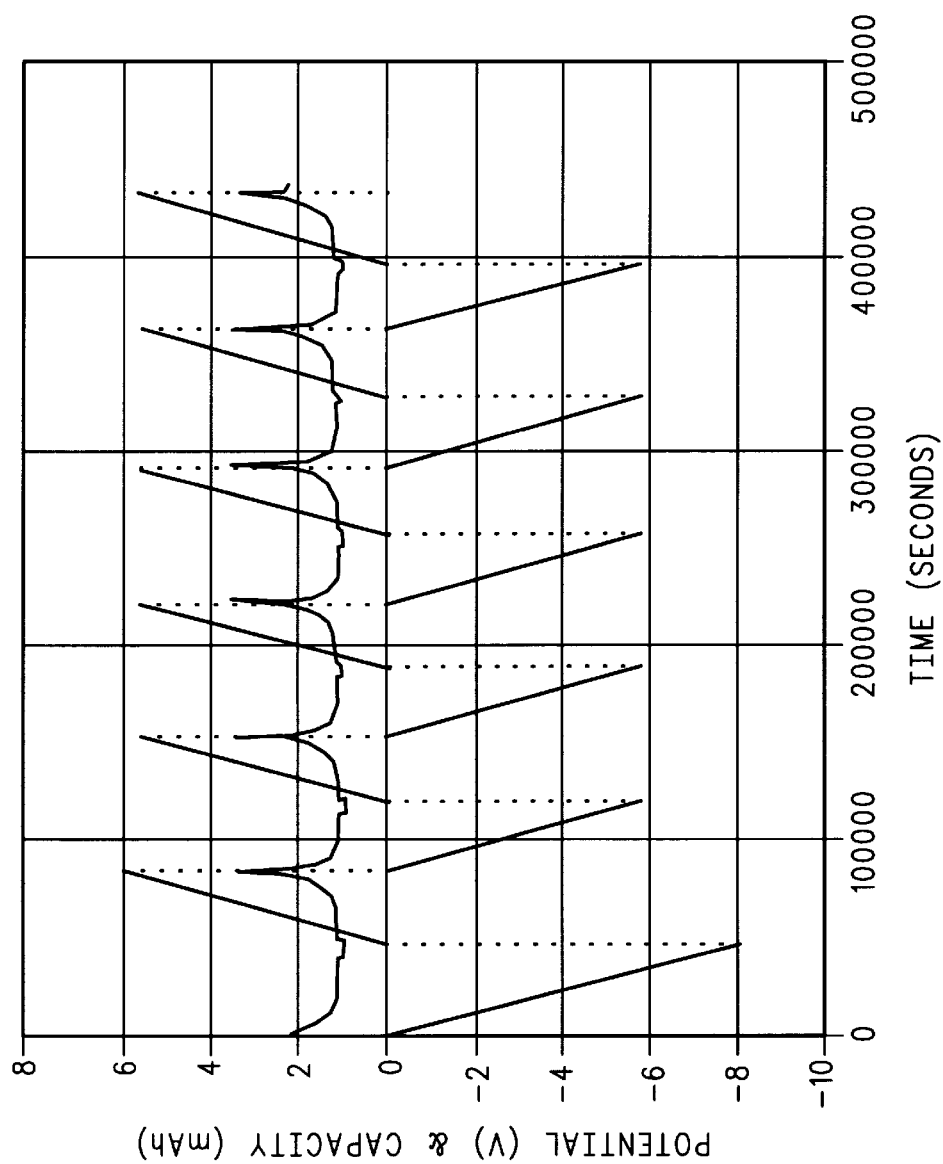
FIG. 10 is a plot of the first six electrochemical cycles for a carbon material fabricated in accordance with the instant invention, derived from a carbonization substrate consisting of a Kraft process-derived lignin to which had been added 18 wt % sodium acrylate. The carbon was cycled versus a lithium metal counterelectrode, but the perceived voltage was ca. 1.2V higher than actual potential due to the voltage sense being held in series with a nickel metal hydride cell. The solid line represents the measured voltage during charge and discharge, while the dotted line represents the cumulative capacity for each half cycle. The solid line represents the measured voltage during charge and discharge. The cycling was carried out under constant current and was terminated by a one-hour rest step after the fourth cycle.

A mixture of 8.2 g Repap™ organosolv lignin and 1.8 g sodium acrylate (Acrylic acid, sodium salt, 99%, cat. no. 40,822-0, Aldrich Chemical Co., 1001 West Saint Paul Ave., Milwaukee, Wis. 53233, (800) 558-9160 or (414) 273-3850) was made in the manner described in Example V, then carbonized, as described in that example, using instead of Repap™ organosolv lignin, Westvaco IndulinAT™ lignin. The final carbon had first cycle efficiency of 70% and reversible capacity of ca. 458 mAh/g of active material, and did not foam visibly or expand during curing and carbonization. FIG. 10 illustrates the cycling performance of this material in a half-cell.

Example VII

Figure 11:
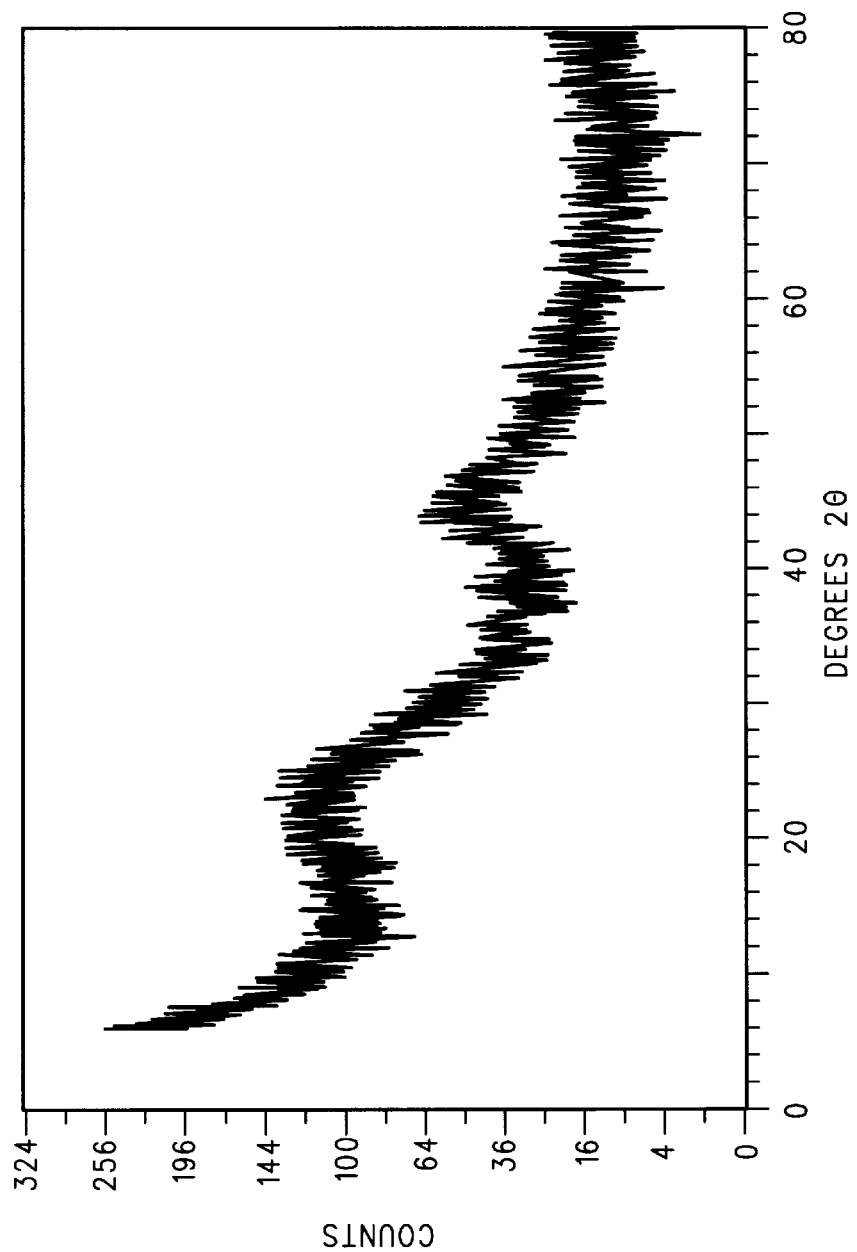
FIG. 11 is an x-ray diffraction analysis for a carbon material fabricated in accordance with the instant invention, derived from a carbonization substrate consisting of an organosolv lignin to which had been added 15 wt % of the sodium salt of 4-vinylbenzenesulfonic acid.

A mixture of 8.5 g Repap™ organosolv lignin and 1.5 g sodium 4-styrene sulfonate (4-Styrenesulfonic acid, sodium salt, 99%, cat. no. 32,859-6, Aldrich Chemical Co., 1001 West Saint Paul Ave., Milwaukee, Wis. 53233, (800) 558-9160 or (414) 273-3850) was made in the manner described in Example I using 2-propanol instead of water to mix in the salt, then carbonized, as described in that example. FIG. 11 shows the X-Ray diffraction spectrum for the product carbon.

Figure 12:
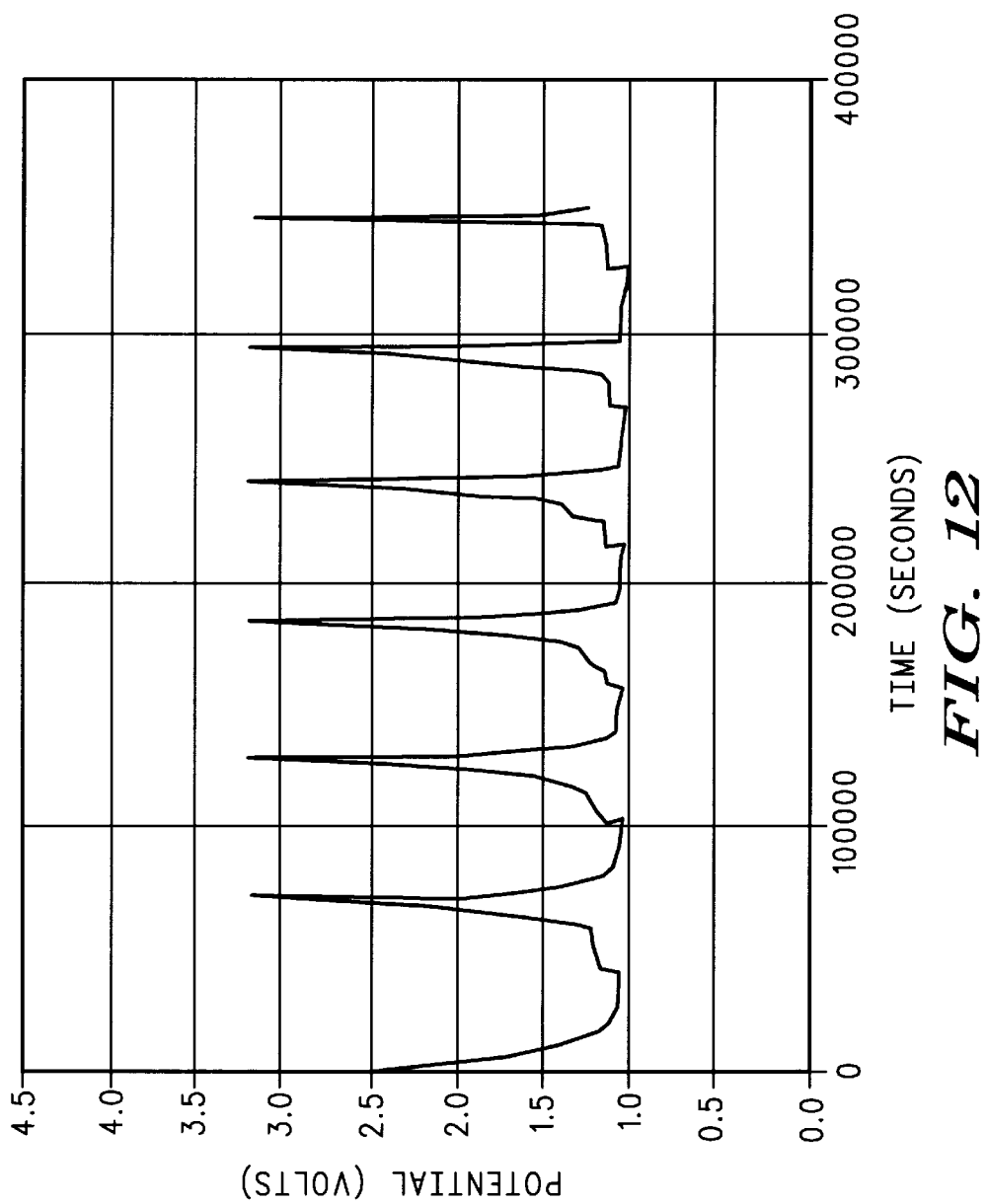
FIG. 12 is a plot of the first six electrochemical cycles for a carbon material fabricated in accordance with the instant invention, derived from a carbonization substrate consisting of an organosolv lignin to which had been added 15 wt % of the sodium salt of 4-vinylbenzenesulfonic acid. The carbon was cycled versus a lithium metal counterelectrode, but the perceived voltage was ca. 1.2V higher than actual potential due to the voltage sensor being held in series with a nickel metal hydride cell. The solid line represents the measured voltage during charge and discharge. The cycling was carried out under constant current and was terminated by a one-hour rest step after the sixth cycle.

The final carbon had first cycle efficiency of 71% and reversible capacity of ca. 445 mAh/g of active material; foaming during the curing step was quite modest. FIG. 12 illustrates the cycling performance of the material in a half-cell.

It will be appreciated by now that there has been provided a more efficient method for manufacturing a carbon material that has improved performance when used for an electrode in an electrochemical cell.

What is claimed is:

1. A method of fabricating an amorphous carbon material for use as an electrode in an electrochemical cell, said method comprising the steps of:

mixing a lignin material with a salt; and heating the lignin and salt mixture;

wherein the salt comprises sodium sulfate.

2. A method of fabricating an amorphous carbon material for use as an electrode in an electrochemical cell, said method comprising the steps of:

mixing a lignin material with a salt; and heating the lignin and salt mixture;

wherein the salt comprises one or more polymerizable ions.

3. The method of claim 2, wherein the salt comprises a cation and an anion, the anion being selected from the group consisting of acrylate, methacrylate, vinyl sulfonate, 4-styrenesulfonate, methyl-4-oxybenzoate, acetylide, and combinations thereof.

4. The method of claim 2, wherein the salt comprises a cation and an anion, the cation being selected from the group consisting of N-methyl-4-vinylpyridinium; α,α'-bis(tetrahydrothiophenio)-xylene; allyl trimethylammonium, and combinations thereof.

5. The method of claim 2, wherein the salt comprises sodium acrylate.

6. The method of claim 2, further comprising the step of adding to the lignin and salt mixture a polymerization initiator present in 0.001 to 5.0 weight percent relative to the polymerizable salt weight.

7. The method of claim 6, wherein the polymerization initiator is comprised of one or more of a dialkyl peroxide or azobis-isobutyronitrile.

8. A method of fabricating an amorphous carbon material for use as an electrode in an electrochemical cell, said method comprising the steps of:

mixing a salt with an organic material; and heating the salt and the organic material mixture;

wherein the organic material is selected from the group consisting of phenolphthalein, 1-aminoanthraquinone, fluorescein, pyromellitic diimide, and combinations thereof.

* * * * *

UNITED STATES PATENT AND TRADEMARK OFFICE
CERTIFICATE OF CORRECTION

PATENT NO : 6,099,990
DATED : August 8, 2000
INVENTOR(S) : Denton, III, et al.

It is certified that error appears in the above-identified patent and that said Letters Patent are hereby corrected as shown below:

On the title page:

Attorney, Agent or Firm, reads "Borrus" should be --Burrus--.

Signed and Sealed this

First Day of May, 2001

Attest:

NICHOLAS P. GODICI

Attesting Officer

Acting Director of the United States Patent and Trademark Office